United States Patent

Volenec

[11] 4,283,876
[45] Aug. 18, 1981

[54] FISHING PLUG WITH INTERNAL ATTRACTERS

[76] Inventor: Donald C. Volenec, 5042 Frederick St., Omaha, Nebr. 68106

[21] Appl. No.: 22,935

[22] Filed: Mar. 22, 1979

[51] Int. Cl.³ ............................................. A01K 85/00
[52] U.S. Cl. ................................................. 43/42.33
[58] Field of Search ..................... 43/41, 42.35, 42.31, 43/42.33, 42.34

[56] References Cited

U.S. PATENT DOCUMENTS

| | | | |
|---|---|---|---|
| 2,288,595 | 7/1942 | Peterson | 43/42.33 |
| 2,309,521 | 1/1943 | Mabee | 43/42.33 |
| 2,511,138 | 6/1950 | Woods | 43/41 |
| 2,629,960 | 3/1953 | Baxter | 43/42.33 X |
| 2,694,877 | 11/1954 | Wise | 43/42.33 |
| 2,994,983 | 8/1961 | Best | 43/41 |
| 3,885,340 | 5/1975 | Volenec | 43/42.33 |
| 4,069,610 | 1/1978 | Firmin | 43/42.31 |

FOREIGN PATENT DOCUMENTS 934245 8/1963 United Kingdom .................. 43/42.33

Primary Examiner—Gary L. Smith
Assistant Examiner—Robert P. Olszewski
Attorney, Agent, or Firm—Hiram A. Sturges

[57] ABSTRACT

A fishing plug having internal flexible attracters, the plug having a hook carrying body with open space therein receiving elongated flexible attracters in an open space and adapted to flex as the plug is moved, the attracters being visible through transparent body portions, the body being incompletely filled with fluid for further causing movement, the attracters each being fixed at one end to the body for maintaining position.

21 Claims, 4 Drawing Figures

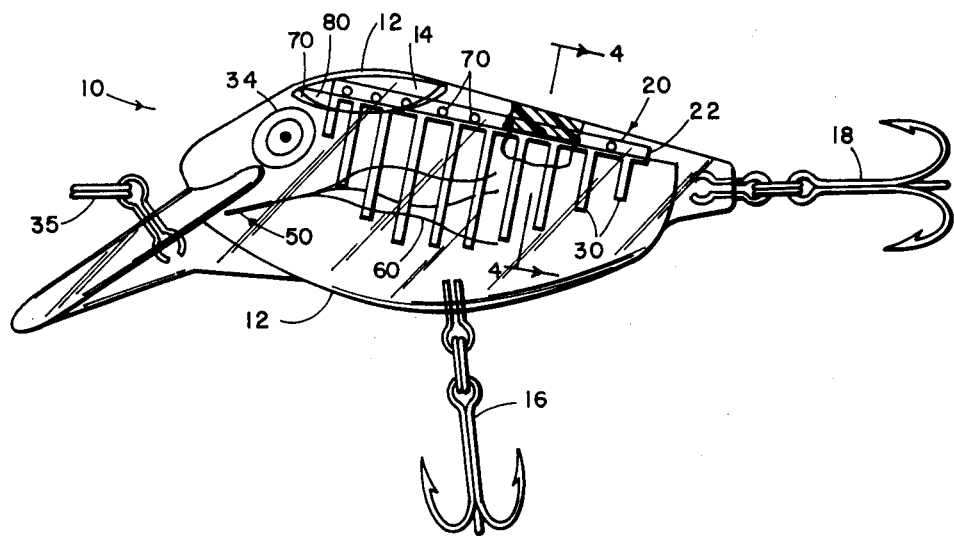
FIG.1
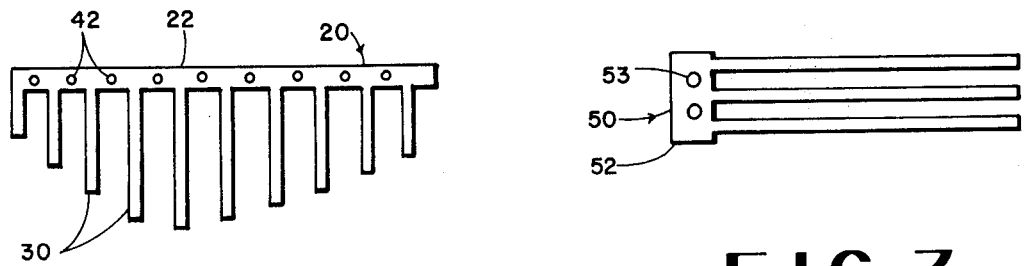
FIG.2
FIG.3
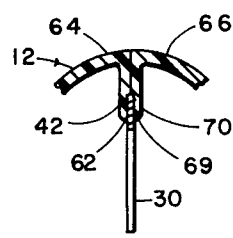
FIG.4

FISHING PLUG WITH INTERNAL ATTRACTERS

BACKGROUND OF THE INVENTION

This invention is in the field of fishing plugs, having hook carrying bodies and particularly in the field of plugs having moving elements therein visible through transparent side portions of the plug body. An example of such a plug is found in my own earlier U.S. Pat. No. 3,885,340, issued May 27, 1975 and titled: FISHING LURE.

In the patent the moving elements were shining particles which had no resemblence to anything a fish ordinarily experiences in nature.

It is the object of this invention to improve such lures by providing a fishing plug having the worm-like waving attracters therein, which are held in position to some extent by being fastened at one end to the body of the plug and the free ends of the attracters moving back and forth or up and down, or both, in manners attractive to fish.

Such attracters would be different from worms, although they would be similar in many ways to worms, thereby resembling something which fish experience in nature.

An object of this invention is to provide for the attracters to be economically positioned and fastened in place in the plug before two halves of the plug closed and bonded together, this being preferably done by having a group of attracters attached to a common element, which latter is in turn attached to the thermoplastic body of a plug. Such a common element can be the same piece of material of which the group of flexible attracters are made, the common element then can be perforated, so that when it is fixed in place, either the thermoplastic material of the plug, or the bonding agent can extend through the perforations to firmly attach the common element in place.

Although the attracters can be simply in an empty place in the plug, I prefer the attracters to be received in fluid, which incompletely fills the space around the attracters so that the fluid will move freely, causing the attracters to move because of being moved by the fluid.

SUMMARY OF THE INVENTION

A major goal of this invention is to provide a fishing plug having internal flexible attracters, the plug having a hook carrying body with open space therein receiving elongated flexible attracters in an open space and adapted to flex as the plug is moved, the attracters being visible through transparent body portions, the body being incompletely filled with fluid for further causing movement, the attracters each being fixed at one end to the body for maintaining position.

BRIEF DESCRIPTION OF THE DRAWING

FIG. 1 is a side elevation of the fishing plug of this invention.

FIG. 2 is a detail showing the downwardly hanging attracter assembly of this invention, as seen from the side.

FIG. 3 is a detail showing the rearwardly extending attracter assembly of this invention, as seen from the top.

FIG. 4 is a sectional view taken along the line 4—4 of FIG. 1, but with portions of the plug to the rearward of the sectional plane removed and all but a small upper part of the plug body being removed.

DESCRIPTION OF THE PREFERRED EMBODIMENT

The fishing plug of this invention is generally indicated at 10 in FIG. 1, and has a closed body 12, having an open space 14 therein, and having hooks 16 and 18 attached to its outer side.

An attracter assembly is shown at 20, in FIG. 1, and has a base or common element 22, formed preferably of one piece, with a plurality of elongated flexible attracters 30, which hang downwardly from the base 22.

The attracters 30 are sufficiently flexible that as the plug 10 is reeled in on a line, not shown, but connected at the forward end of the plug at 34, the attracters 30 will move.

The movement of the attracters 30 is a bending of any one portion thereof, first in one direction, and then in an opposite direction to a substantial extend visible to a fish through the body 12, the body being transparent at least in the areas thereof which are adjacent to the attracters 30 so that fish near the plug can see the attracters 30 through the body 12.

One way to accomplish this is to make the body entirely of transparent thermoplastic material, except for eyes 34, which are affixed to the body 12.

The actuators 30 can be sufficiently thin in proportion to their length as to resemble worms to provide each with a simulation to objects a fish sees in nature.

The actuator assembly 20 has a plurality of perforations 42 extending through its base 22 from left to right, and it is only the base 22 which is attached to the innerside of the body 12, the attracters 30 themselves being unattached, except for their attachment to the base 22 at one end of each of the attracters 30.

The purpose of the perforations 42 is to receive transparent bonding material therethrough, which is itself attached to the body 12. Such bonding material is not especially visible because it would be transparent.

The transparent body 12 can itself be the bonding material since plastic of which the plug 12 is formed could also be in a condition of adherence to the base 22, either with or without use of the perforations 42. When the perforations 42 are used the plastic material of the base 12 could have flowed therethrough at a time when the plastic material is molten for making a good connection.

However, the perforations 42 are not vital, since ordinary cement used in thermoplastic work will also do the job.

Referring to FIG. 3, a smaller attracter assembly is there shown at 50, having a plurality of attracters 60. The assembly 50 has a base 52 with perforations 53, which latter are not seen in FIG. 1 because FIG. 3 is a top plan view and FIG. 1 shows the entire attracter assembly 50 of FIG. 3 but only in edge view, since the thickness of each attracter 60 is wider than the thickness of the plastic material used to make the attracter assembly 50 of one piece.

The same is true of the attracter assembly 20, namely, that its thinness in top plan view would be as thin as the attracter assembly 50 is when seen in side elevation in FIG. 1.

In FIG. 1 it will be seen that the attracter assembly 50 is substantially mounted so that its elongated attracters 60 extend forwardly and rearwardly in the plug 10.

The base 52 is attached to the forward end of the transparent body 12 in a similar manner to the way the base 20 of FIG. 2 is attached and since all securing parts are transparent, nothing is visible concerning them.

The interior of the plug is seen at 14 to be filled with fluid 70 of a transparent nature so that it is itself not visible, except for the visibility of a bubble 80 formed thereby. The bubble 80 is a result of filling the interior 14 of the body 12 incompletely which is for the purpose of allowing the fluid therein to shift back and forth in all directions which also causes the attracters 30 and 60 to be moved in all directions, and the bubble 80 itself to shift as the plug 10 is moved, so that the total movement of two different kinds of attracters and the bubble 80 adds up to a great amount of movement.

The attracters 30 preferably are of various lengths with lower ends free of touching the lower side of the interior of the body 12.

The base 22 can be received in a space 62 between a right half 64 and a left half 66 of the body, the base 22 being put in place before the right and left halves of the body are bonded together and held in place by bonding agent 69 in the perforations 42, alone, or by horizontally projecting nibs 70 which are of one piece with the right body half 64 for, example, or by both nibs 70 and bonding agent 69.

I claim:

1. A fishing plug having a closed body having an open space therein and having attached hook means on its outer side, a plurality of elongated flexible attracters in said open space in said body, said body being transparent adjacent said attracters and said attracters being sufficiently flexible that when said plug is reeled in on a line in conventional plug-fishing portions of said flexible attracters will bend first in one direction then in an opposite direction to a substantial extent visible to fish through said body, the majority of said attracters being unattached to said body along the majority of their length, and also free of being crushed together so as to remain substantially unmassed during said reeling whereby they are free to move substantially independently of each other during said reeling.

2. The fishing plug of claim 1 having said body having fluid in it which incompletely fills its otherwise empty interior spaces adjacent said attracters whereby movement of said fluid causes movement of said attracters.

3. The fishing plug of claim 1 having means attaching one end of each of said attracters to said body.

4. The fishing plug of claim 1 having means attaching one end of each of said attracters to said body having attracters extending downwardly from attached upper ends.

5. The fishing plug of claim 1 having means attaching one end of each of said attracters to said body having certain of said attracters extending rearwardly from attached forward ends.

6. The fishing plug of claim 5 having certain of said attracters extending downwardly from attached upper ends.

7. The fishing plug of claim 1 having means attaching one end of each of said attracters to said body comprising a base to which said some of said attracters are attached.

8. The fishing plug of claim 7 having said base being perforated, said body being of thermoplastic material and said material extending through at least one perforation in said base.

9. The fishing plug of claim 1 having at least the majority of said attracters being attached to said body in a manner so as to be spaced from and moving independently of other ones of said body-attached attracters.

10. The fishing plug of claim 9 having said body having fluid in it which incompletely fills its otherwise empty interior spaces adjacent said attracters whereby movement of said fluid causes movement of said attracters.

11. The fishing plug of claim 9 having said majority of attracters being attached to said body at one end of each attracter.

12. The fishing plug of claim 1 having a substantial number of said attracters being attached to said body at their upper ends and being positioned extending downwardly from their attached upper ends.

13. The fishing plug of claim 1 having a substantial number of said attracters being attached to said body at their forward ends and being positioned extending rearwardly from their attached forward ends.

14. The fishing plug of claim 12 having a substantial number of said attracters being attached to said body at their forward ends and being positioned extending rearwardly from their attached forward ends.

15. The fishing plug of claim 9 having means attaching one end of each of said attracters to said body attaching some of said attracters to comprising a base to which said some of said attracters are attached, said base being made from the same material as said some of said attracters.

16. The fishing plug of claim 1 having said attracters being substantially opaque for maximum light reflection.

17. The fishing plug of claim 1 having the majority of said attracters each being at least twice as long as they are wide for an ease of flexing.

18. The fishing plug of claim 1 having the majority of said attractors each being at least three times as long as they are wide for an ease of flexing.

19. The fishing plug of claim 9 having said attracters being substantially opaque for maximum light reflection.

20. The fishing plug of claim 9 having the majority of said attracters each being at least twice as long as they are wide for an ease of flexing.

21. The fishing plug of claim 9 having the majority of said attracters each being at least three times as long as they are wide for an ease of flexing.

* * * * *